US006265651B1

(12) United States Patent
Landtroop

(10) Patent No.: US 6,265,651 B1
(45) Date of Patent: Jul. 24, 2001

(54) GAUGE FOR SELECTING MUSICAL INSTRUMENT STRINGS

(75) Inventor: Jeffrey Landtroop, Vicksburg, MI (US)

(73) Assignee: American Winding Company, Vicksburg, MI (US)

( * ) Notice: Subject to any disclaimer, the term of this patent is extended or adjusted under 35 U.S.C. 154(b) by 0 days.

(21) Appl. No.: 09/491,392

(22) Filed: Jan. 26, 2000

Related U.S. Application Data

(60) Provisional application No. 60/117,463, filed on Jan. 26, 1999.

(51) Int. Cl.[7] .................................................... G09B 15/02

(52) U.S. Cl. ................ 84/471 R; 84/470 R; 84/471 SR; 84/453; 33/15 B; 33/15 A; 33/15 D

(58) Field of Search ................................ 84/453, 470 R, 84/471 R, 297 S, 312 R, 454, 471 SR; 33/15 B, 15 A, 15 D

(56) References Cited

U.S. PATENT DOCUMENTS 3,648,025 * 3/1972 Adams .................................. 235/83
3,960,046 * 6/1976 Choong ............................. 84/471 R

* cited by examiner

*Primary Examiner*—Shih-Yung Hsieh
(74) *Attorney, Agent, or Firm*—Robert O. Guillot; Oppenheimer Wolff & Donnelly LLP

(57) ABSTRACT

The present invention is a gauge for selecting musical instrument strings. It includes a base member and at least one movable member that is engaged to the base member, and which provides information related to specific musical strings. In preferred embodiments, musical string information is written onto the base member and the movable members contain viewing windows that display the information. A separate movable member is provided for each string of a string set. In the preferred embodiment, the base member and movable members are shaped as crcular disks and they are rotatably joined about a common centrally disposed axle.

5 Claims, 6 Drawing Sheets

GAUGE FOR SELECTING MUSICAL INSTRUMENT STRINGS

CROSS REFERENCE TO RELATED APPLICATIONS

This application claims priority to U.S. Provisional Application Ser. No. 60/117,463 filed Jan. 26, 1999.

BACKGROUND OF THE INVENTION

1. Field of the Invention

The present invention relates generally to musical instrument string gauges, and more particularly to a gauge for selecting musical instrument strings based upon a player's personal preference.

2. Description of the Prior Art

A set of strings for a musical instrument includes a plurality of predetermined strings having particular gauges to produce particular pitch tones at particular predetermined string tensions. Thus, when tuned to pitch, each string will have a particular playing feel for the user based predominantly upon the string tension force. Currently, when a player doesn't like the playing feel of a particular string, the player commences a trial and error search for a replacement string, knowing generally that a lighter (thinner) gauge string will have a lower tension force when tuned to pitch, and a heavier (thicker) string will have a higher tension force when tuned to pitch. The present invention is a device that replaces the trial and error approach. To the inventor's knowledge there is no device (such as the present invention) that seeks to aid the player in searching for a replacement string having an acceptable playing feel.

SUMMARY OF THE INVENTION

The present invention is a gauge for selecting musical instrument strings. It includes a base member and at least one movable member that is engaged to the base member, and which provides information related to specific musical strings. In preferred embodiments, musical string information is written onto the base member and the movable members contain viewing windows that display the information. A separate movable member is provided for each string of a string set. In the preferred embodiment, the base member and movable members are shaped as circular disks and they are rotatably joined about a common centrally disposed axle.

It is an advantage of the device of the present invention that a musical instrument player is aided in selecting a replacement string having an acceptable playing feel.

It is another advantage of the present invention that replacement musical instrument strings are more readily determinable.

These and other features and advantages of the present invention will become understood to those skilled in the art upon reading the following detailed description which makes reference to the several figures of the drawing.

IN THE DRAWINGS

DETAILED DESCRIPTION OF THE PREFERRED EMBODIMENTS

The music string selection gauge of the present invention is generally provided for use by music instrument players. The following description will generally make reference to a six string guitar; however, the invention is fully applicable to four string guitars, banjos, mandolins and other stringed musical instruments. It is particularly suitable for stringed musical instruments that are played by the fingers of the player, such as guitars.

When a set of strings is installed on a musical instrument, the user winds each string individually. Each string is tightened until the sound generated by the string reaches the appropriate pitch. When each string has been tightened to the appropriate amount, the musical instrument is fully tuned. It is well known in the art of guitar string manufacturing that each particular string, having a particular gauge (string diameter) will be tuned to its designed pitch when a specific tension force, measured in pounds, is applied to it. For instance, a particular type of steel string being tuned to the note of "A" (110 hertz), and having a gauge of 0.036 inches is tuned to pitch at a tension force of approximately 19.7 pounds, while a second string made of the same materials but having a gauge of 0.034 inches is tuned to the same pitch with a tension force of approximately 17.6 pounds. Therefore, as is well known, musical instrument strings of differing gauges are tuned to pitch with differing tension forces applied thereto. Generally, a heavier gauge string requires a stronger tension force to achieve the same pitch as a lighter gauge string with its lower tension force.

After the musical instrument player that has installed a set of strings on the musical instrument and tuned each string to pitch, he (or she) may not like the feel of one or more of the strings. That is, for the player's personal taste, a particular string may feel too tight or too loose, even though it is tuned to pitch. In this situation, the player may desire to selectively replace the problem string with a different string. Particularly, if the problem string is too tight for the player, the string can be replaced with a lighter gauge string that requires less tension force to be tuned to pitch. Conversely, if the problem string feels too loose, it can be replaced with a heavier gauge string that requires a higher tension force to be tuned to pitch. Therefore, a particular musical instrument player can start with a particular set of strings and selectively personalize the string set by replacing one or more of the strings to ultimately achieve a personalized playing feel that the player finds most comfortable. The present invention provides a simple, effective means for musical instrument players to selectively replace problem strings.

Figure 1:
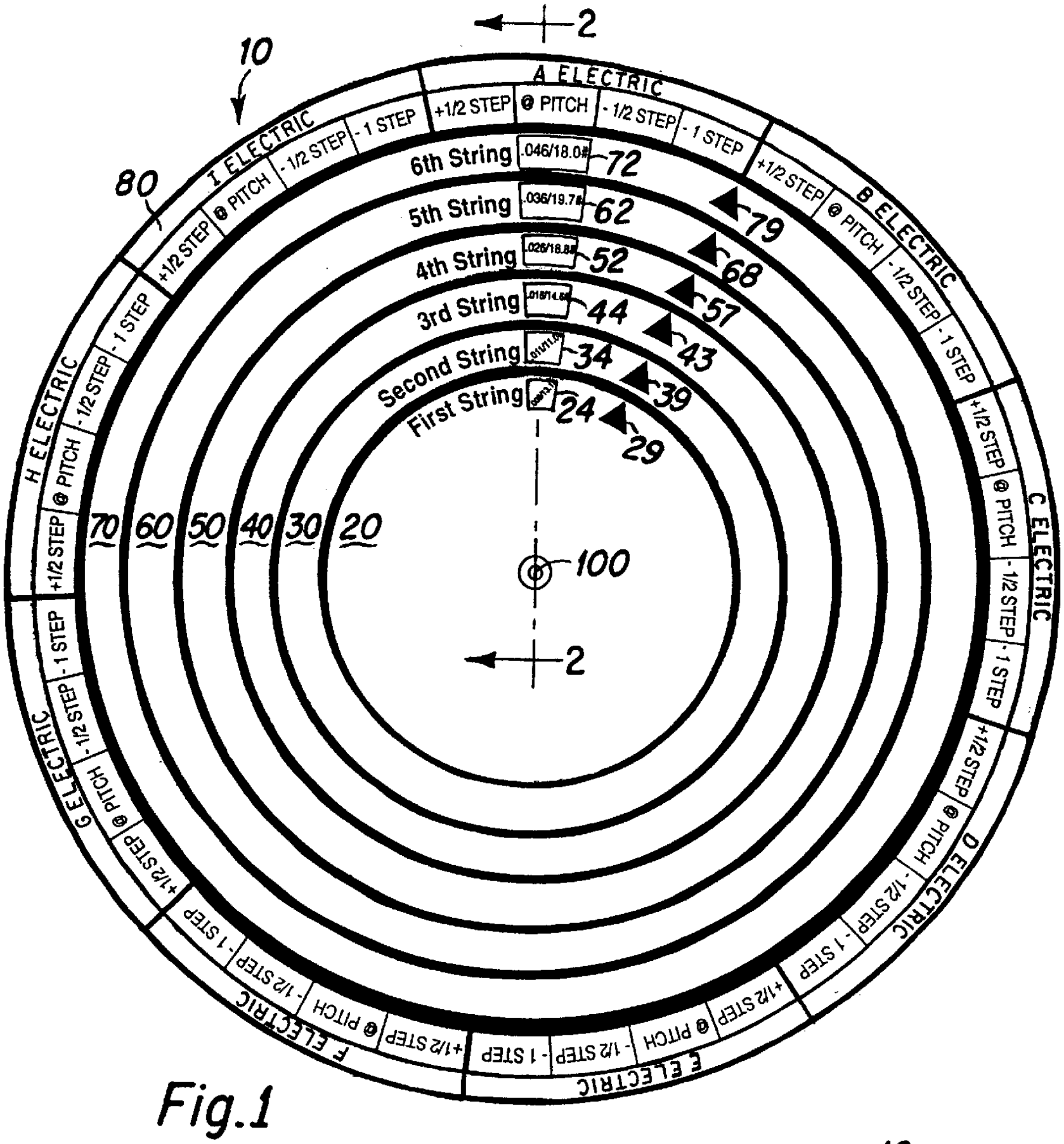
FIG. 1 is a top plan view of an embodiment of the present invention particularly adapted for a six string musical instrument, such as a guitar.
Figure 2:
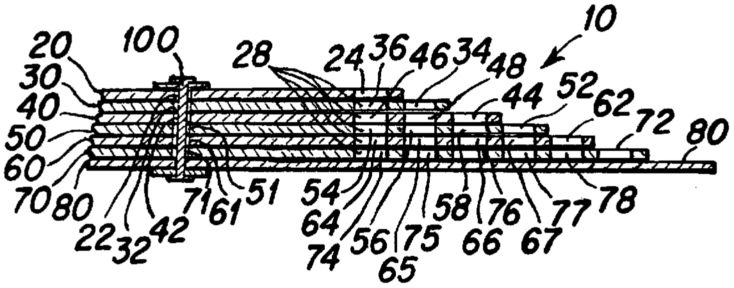
FIG. 2 is a side cross-sectional view taken along lines 2—2 of FIG. 1.

An embodiment 10 of the present invention that is suitable for a six string musical instrument, such as a guitar, is depicted in FIGS. 1 and 2, wherein FIG. 1 is a top plan view, and FIG. 2 is a side cross-sectional view taken along lines 2—2 of FIG. 1. As is seen in FIGS. 1 and 2, the gauge 10 is formed with a plurality of disks 20, 30, 40, 50, 60, 70, 80 that are rotatably mounted upon a common central axle member 100. The device 10 thus includes an individual disk (20, 30, 40, 50, 60, 70) for each string (first, second, third, fourth, fifth and sixth), respectively of a six string set, and a base disk 80 that has string data for each string written thereon. Each of the disks is next described, followed by a description of the operation of the assembled device 10.

Figure 3:
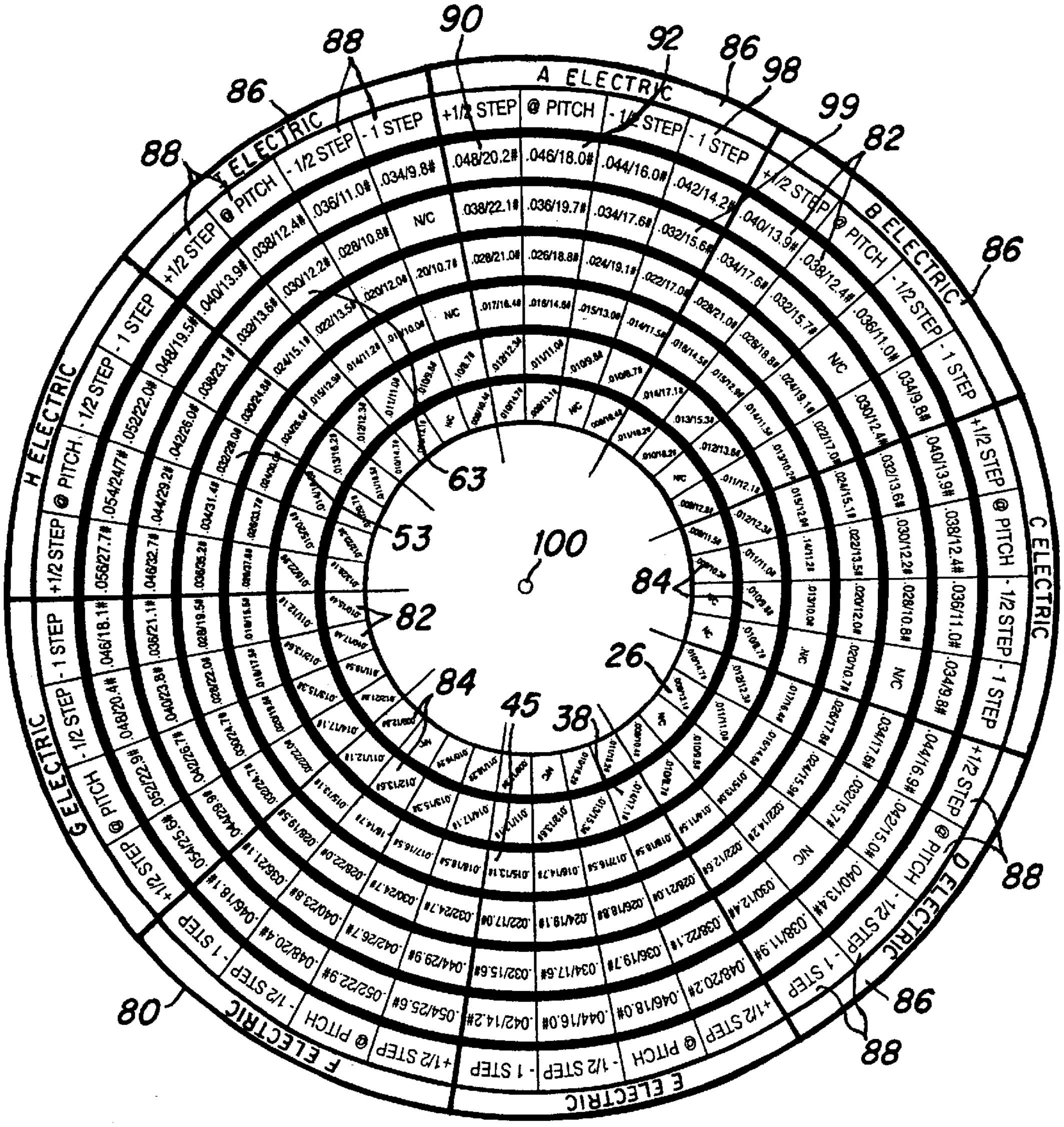
FIG. 3 is a top plan view of the base disk having musical string information written thereon.

A top plan view of the base disk 80 is depicted in FIG. 3. The base disk 80 includes musical string information disposed in spaces 82 arranged in circular bands 84 that is relevant to each of the musical instrument strings of the string set. Initially, the disk 80 is divided into a plurality of arcuate, pie-shaped sections 86 that each refers to an individual set of musical instrument strings. Thus, disk 80 includes nine arcuate shaped sections 86, designated as A Electric, B Electric, C Electric, etc., such that the disk 84 includes information on nine different six string sets of electric guitar strings. Furthermore, each of the arcuate sections 86, such as A Electric, is divided into four subsections 88, designated as +½ STEP, @ PITCH, −½ STEP, and −1 STEP. With regard to the musical string information in each space 82 of the disk, such as the outer band 90 of the A Electric string set, @ PITCH space 92, the designation 0.046/18.0 pounds refers to a string gauge of 0.046 inches and a tension force of 18.0 pounds.

Figure 4:
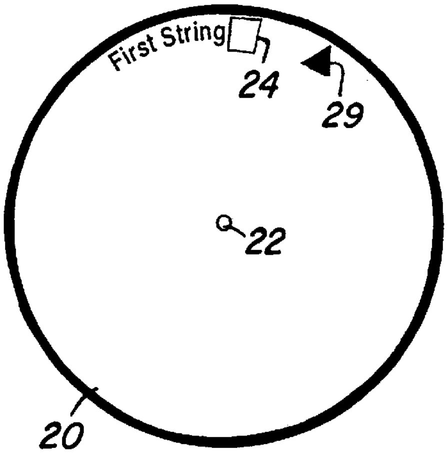
FIG. 4 is a top plan view of the first, inner, rotatable disk of the device depicted in FIG. 1.

The first string disk 20 is depicted in top plan view in FIG. 4. The disk 20 includes a central bore 22 for rotation about the axle 100 and an information window 24 that is disposed to display guitar string information relevant to the first string of the set. The guitar string information viewable through the first disk window 24 is written upon the base disk 80 depicted in FIG. 3 in the innermost information band 26. As will be more fully understood from the following description, in order for the user to view guitar string information written on the base disk 80 through the first string window 24, viewing openings 28 must be formed through each of the intermediate string disks 30, 40, 50, 60, and 70 disposed between the outermost disk 20 and the base disk 80. The first disk also includes a disk alignment arrow 29 that is used to align the disk relative to a chosen set of strings 86, as is described more fully herebelow.

Figure 5:
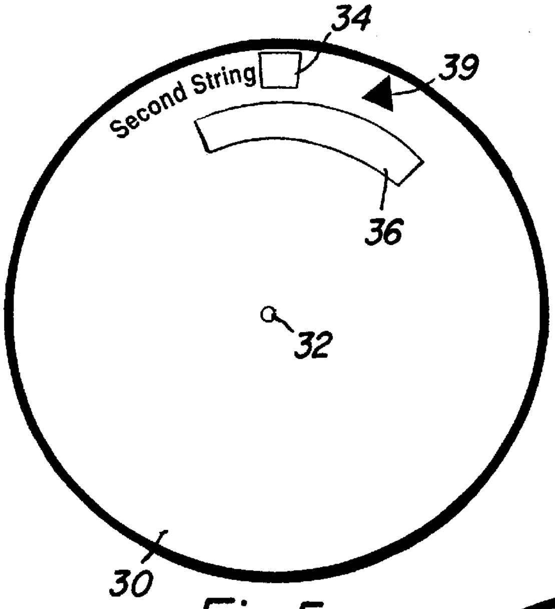
FIG. 5 is a top plan view of a second rotatable disk of the device depicted in FIG. 1.

Referring now to FIG. 5 a top plan view of the second string disk 30 is shown. As depicted therein, the second string disk 30 includes a central bore 32 formed therethrough for rotational engagement with the axle 100. A guitar string information window 34 is formed through the disk proximate its periphery and an arc shaped first string opening slot 36 is formed through the disk 30 in radial register with the window 24 of the first string disk 20. An alignment arrow 39 is disposed on the disk 30. The second string disk 30 is formed with a larger diameter than the first string disk 20, such that information in the second ring 38 of the base disk 80 is viewable through window 34 and the second string disk window 34 is not blocked by the first string disk.

Figure 6:
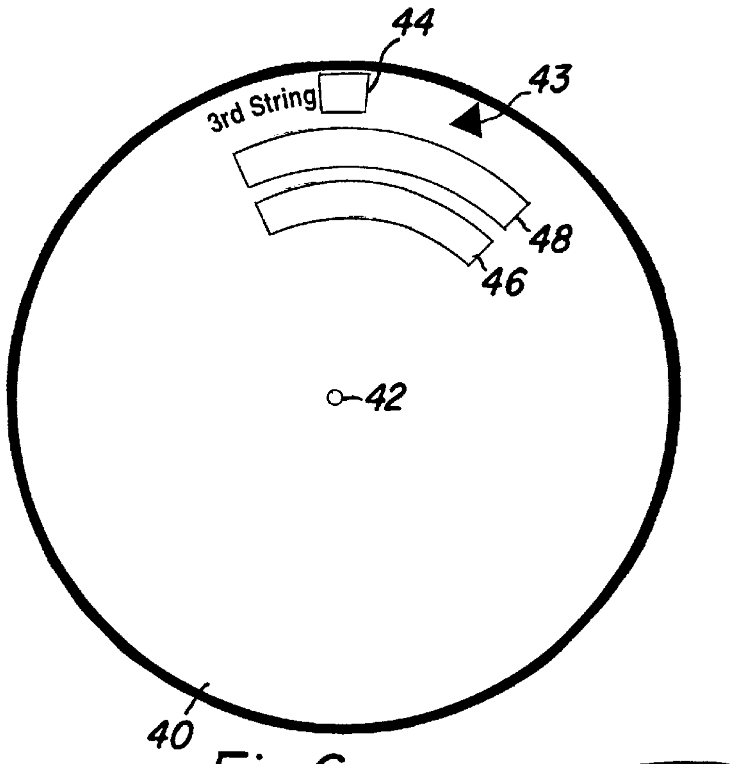
FIG. 6 is a top plan view of a third rotatable disk of the device depicted in FIG. 1.

The third string disk 40 is depicted in top plan view in FIG. 6. The disk 40 has a central bore 42 for rotational mounting about the axle 100, an alignment arrow 43, and a third string information window 44 formed towards its periphery to display information in the third band 45 of the base disk 80. An arc shaped first string opening 46 is formed through the disk 40 in radial register with the arcuate opening 36 formed in the second string disk, which was formed in radial register with the first string disk window 24. Additionally, a second arcuate opening 48 is formed through the disk 40 in radial register with the second string window 34, such that information written on the base disk 80 that relates to the second string can be read through the second string window 34.

Figure 7:
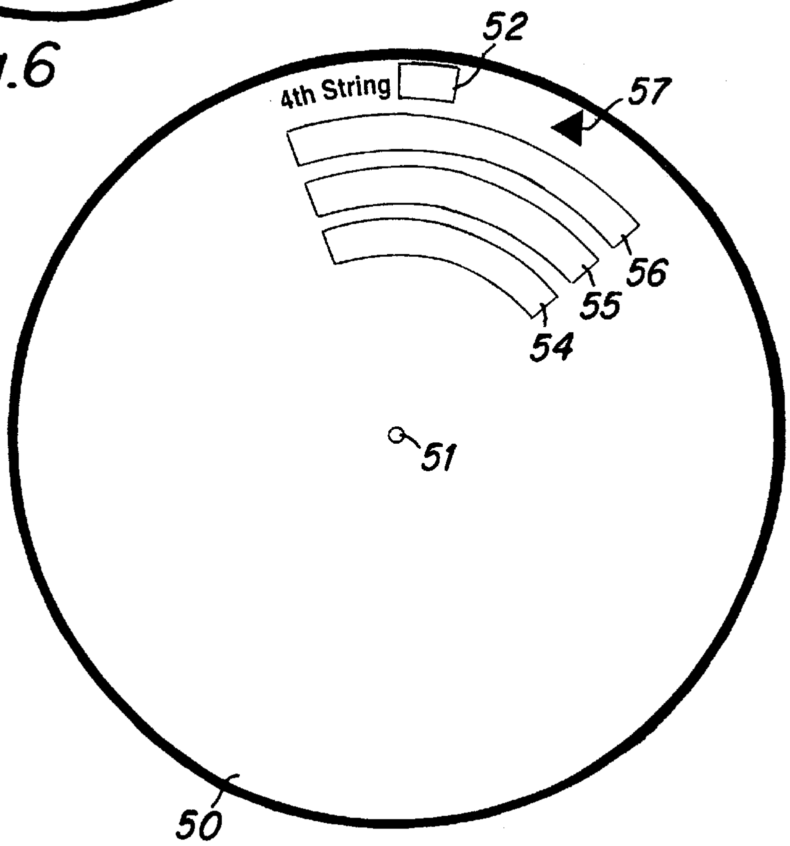
FIG. 7 is a top plan view of a fourth rotatable disk of the device depicted in FIG. 1.

FIG. 7 is a top plan view of the fourth string disk 50. The disk includes a central bore 51 for rotational mounting upon the axle 100, an alignment arrow 57, and a fourth string information window 52 formed towards the periphery of the disk 50 for viewing information in the fourth ring 53 of the base disk 80. A first, inner arcuate opening 54 is formed through the fourth disk 50 in radial register with the arcuate openings 46 and 36 in the third and second string disks respectively and the first string window 24 formed in the first disk, such that information written on the base disk can be viewed through the window 24 of the first string disk. A second arcuate slot 55 is formed through the fourth string disk 50 in radial register with the arcuate opening 48 of the third string disk 40 such that guitar string information relevant to the second string can be read through the second string window 34 of the second disk 30. A third arcuate opening 56 is formed through fourth string disk 50 in radial register with the third string window 44 of the third string disk 40, such that guitar string information written upon third ring 45 of the base disk 80 can be viewed through the third string window 44.

Figure 8:
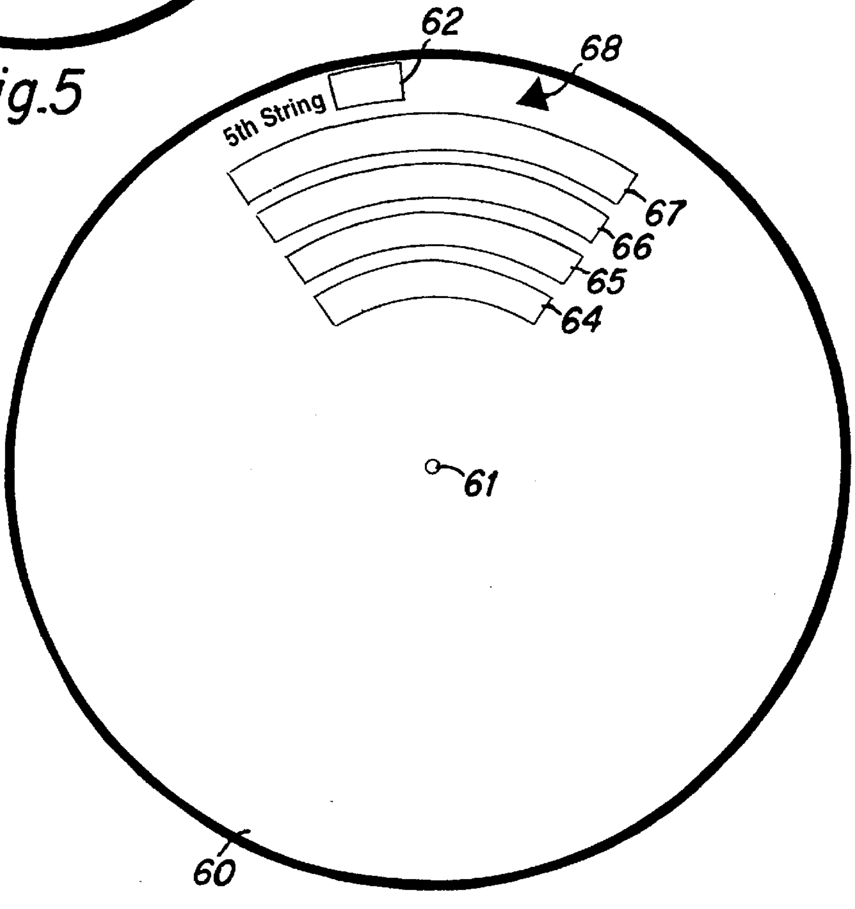
FIG. 8 is a top plan view of a fifth rotatable disk of the device depicted in FIG. 1.

FIG. 8 is a top plan view of the fifth string disk 60. The fifth string disk includes a central bore 61 for the rotational mounting of the disk upon the axle 100 and an alignment arrow 68. A fifth string information window 62 is formed towards the periphery of the disk 60, such that information relevant to the fifth string that is written in a fifth circular band 63 on the base disk 80 can be read therethrough. A first string disk arcuate opening 64, a second string disk arcuate opening 65, a third string disk arcuate opening 66, and a fourth string disk arcuate opening 67 are formed through the fifth string disk 60 in radial register with the windows and arcuate openings formed in the first, second, third and fourth string disks, such that guitar string information written on the base disk 80 can be viewed through the various string information windows of the various disks as has been described above.

Figure 9:
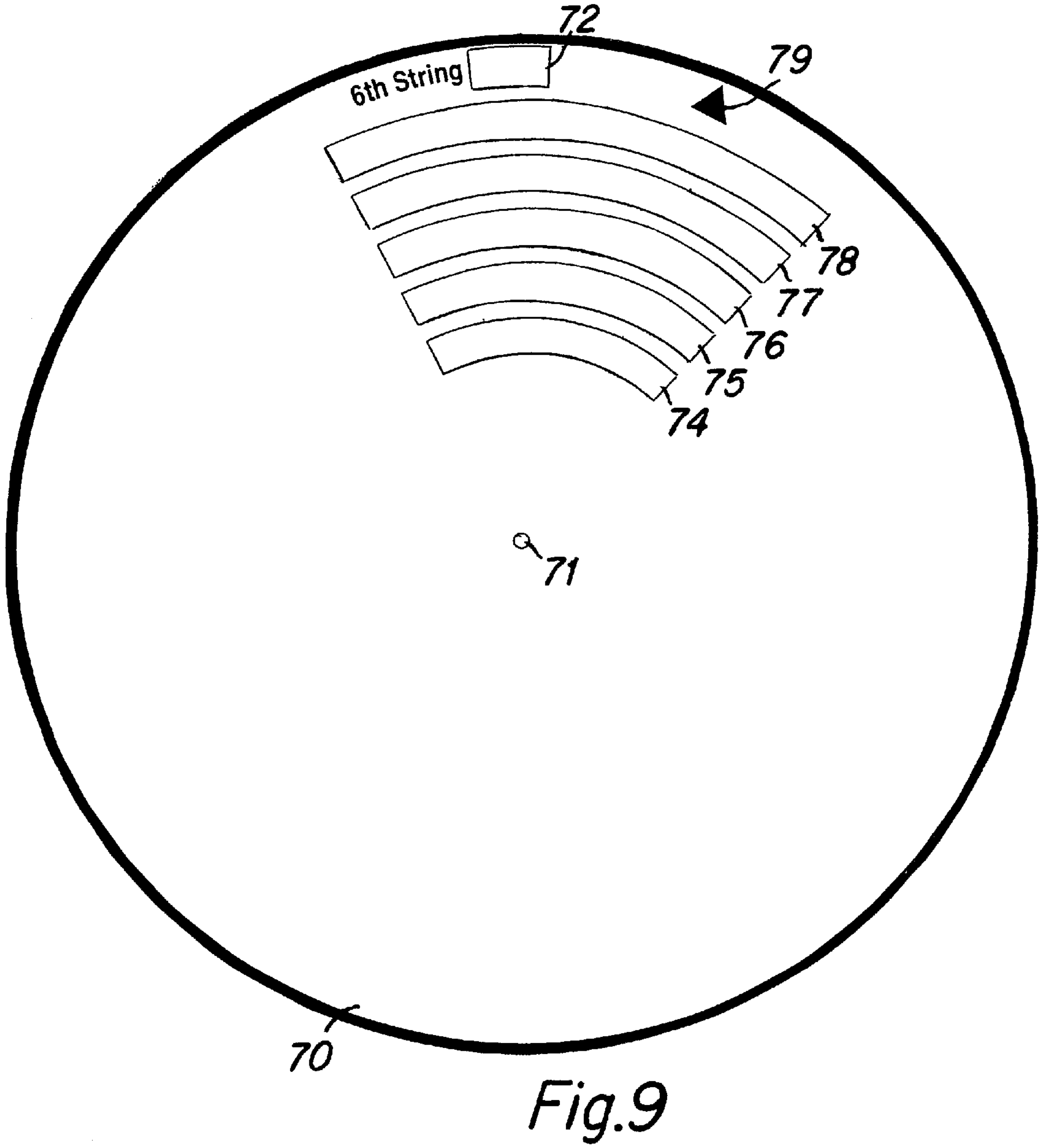
FIG. 9 is a top plan view of a sixth rotatable disk of the device depicted in FIG. 1.

FIG. 9 is a top plan view of the sixth string disk 70. The disk includes a central bore 71 for rotational mounting about the axle 100, an alignment arrow 79, and a sixth string information window 72 formed towards the periphery of the disk 70, such that information relevant to the sixth string that is written in the sixth circular band 90 of the base disk 80 can be read therethrough. A plurality of arcuate openings 74, 75, 76, 77 and 78 are formed through the sixth disk 70 in radial register with the windows and arcuate openings of the preceding five disks, such that guitar string information written on the base disk 80 can be viewed through the various string information windows of the various disks as has been described above.

Figure 10:
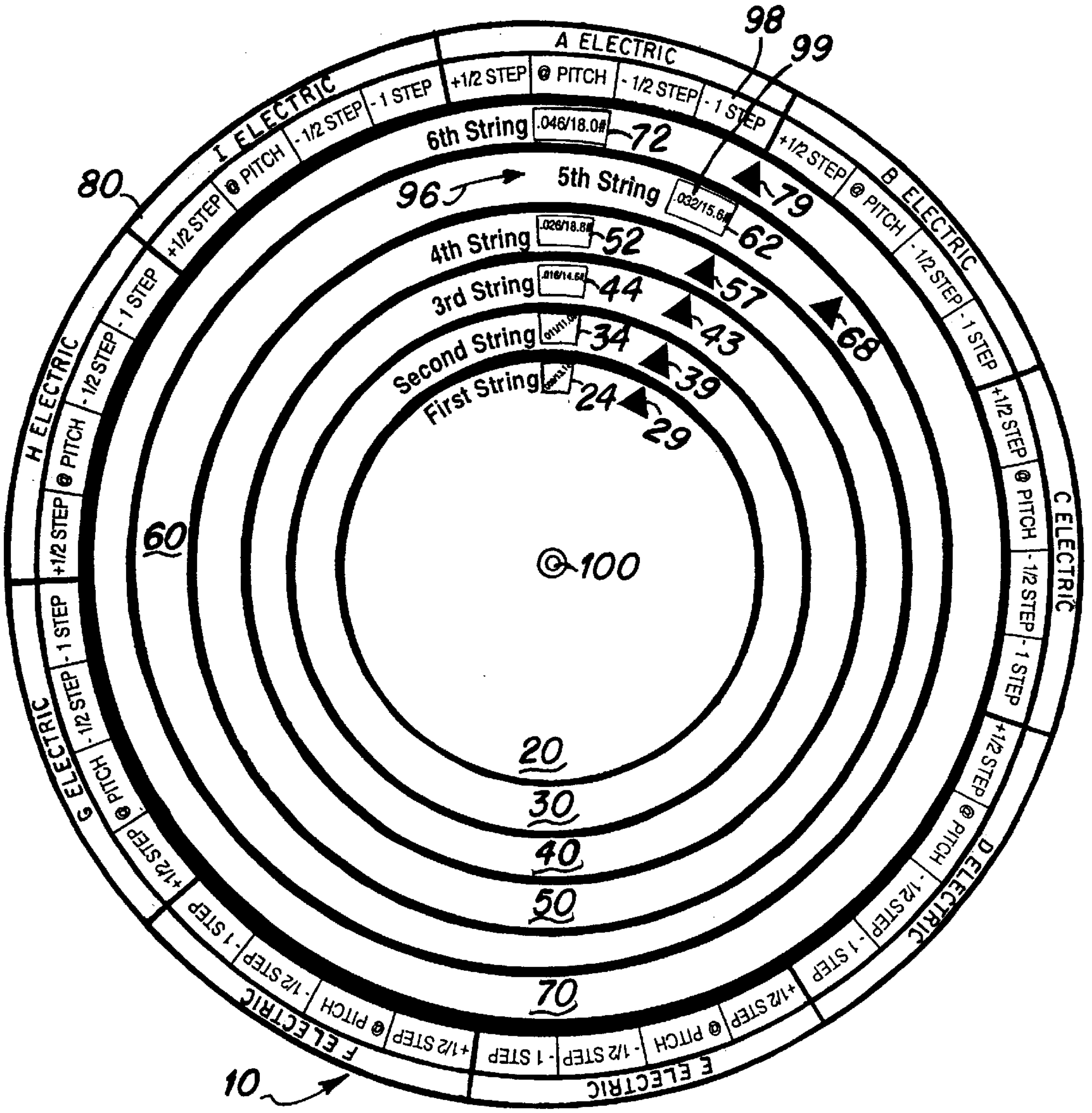
FIG. 10 is a top plan view of the present invention as used to select a musical instrument string.

The utilization of the gauge is next explained with reference to FIG. 1 and FIG. 10 which depicts the gauge 10 in a different orientation from that of FIG. 1. Specifically, as depicted in FIG. 10, the fifth string disk 60 has been rotated to −1 STEP. A hypothetical example will facilitate explanation.

Initially, a user has installed a set of A Electric guitar strings on a six string guitar. The user also adjusts each disk 20, 30, 40, 50, 60 and 70 of the gauge 10 to @ PITCH for the A Electric string set; this is facilitated by aligning the indicator arrows 29, 39, 43, 57, 68, 79 with the right side line of the A Electric set, as depicted in FIG. 1. After tuning each string to pitch, the user decides that the playing feel of the fifth string (for example) is uncomfortable; specifically, it is too tight. The user then loosens (detunes) the fifth string ½ step in tone and determines whether the playing feel is acceptable. A practiced musician can hear when the string is detuned ½ step, otherwise an electronic tuner can be utilized. In this hypothetical example the player decides that the playing feel of the fifth string is still too tight, and the player detunes the string another ½ step (−1 STEP). At this tension force, the player determines that the playing feel of the fifth string is acceptable. Therefore, the player desires a replacement string that is tunable to the proper fifth string pitch, but having a tension force which the player has just determined to be desirable. To accomplish this, the player rotates 96 the fifth string disk 60 from the @ PITCH setting (see FIG. 1) to the −1 STEP setting 98 for the A electric strings, as depicted in FIG. 10. When the fifth string disk 60 has been rotated 96 to −1 STEP, the appropriate string gauge 0.032 with tension 15.6 lbs. is displayed 99 in the string information window 62 of the fifth string disk 60. Thus, a 0.032 gauge string when tuned to pitch will satisfy the user's personal string preference. The significance of the arcuate openings in the various disks now becomes apparent. Specifically, the arcuate openings allow individual disks to be rotated leftward or rightward while still permitting string gauge information to be viewed through the disk windows.

It is therefore to be understood that the musical string selection gauge of the present invention is utilizable by a user to select alternative music strings where one or more particular strings do not have a playing feel that is acceptable to the user. A gauge device with five disks is suitable for a five string musical instrument and a four disk gauge is suitable for a four string musical instrument.

Having comprehended the features of the preferred embodiment described in detail herein, it will be understood by those skilled in the art that movable members having shapes other than the disk shapes of the preferred embodiment could provide suitable results for some applications. Specifically, arcuate and straight line devices having movable portions are feasible. Thus, the words "movable members" are intended by the inventor to encompass more than the specific disk shape of the preferred embodiment.

While the present invention has been shown and described with reference to certain preferred embodiments, it is understood by the inventors that certain alterations and modifications thereto will become obvious to those skilled in the art upon reviewing this disclosure or utilizing the invention described herein. It is therefore intended by the inventors that the following claims cover all such alterations and modifications that nevertheless include the true spirit and scope of the invention.

What I claim is:

1. A gauge for selecting individual musical instrument strings for a set of musical instrument strings, comprising:

a base disk having disposed thereon musical string information related to each individual string in said set of strings;

an axle being centrally engaged to said base disk;

a plurality of circular string disks being rotatably mounted upon said axle;

wherein said base disk is formed with a diameter and each string disk is formed with a diameter, and wherein said base disk has the largest diameter, and wherein the diameter of each said string disk differs from the diameter of each other string disk;

and wherein each said string disk includes a window for viewing said musical string information deposed upon said base disk;

and wherein at least one of said string disks also includes a further opening being alignable in radial register with said window in another of said string disks; and wherein an individual said string disk is provided for each said individual string of said set.

2. The gauge as described in claim 1, wherein six string disks are provided, and wherein the diameter of a first string disk is less than the diameter of a second string disk, which is less than the diameter of a third string disk, which is less than the diameter of a fourth string disk, which is less than the diameter of a fifth string disk, which is less than the diameter of a sixth string disk, which is less than the diameter of said base disk.

3. The gauge as described in claim 2 wherein said openings are formed in said second, third, fourth, fifth and sixth string disks to permit viewing of said musical string information disposed upon said base disk.

4. The gauge as described in the claim 3, wherein said openings are shaped as arcuate slots that are concentric with said axle.

5. The gauge as described in claim 4 wherein said second string disk has one arcuate slot, said third string disk has two arcuate slots, said fourth string disk has three arcuate slots; said fifth string disk has four arcuate slots; and said sixth string disk has five arcuate slots.

* * * * *